US012585849B2

(12) United States Patent
Han et al.

(10) Patent No.: US 12,585,849 B2
(45) Date of Patent: ***Mar. 24, 2026

(54) SIMULATION METHOD FOR ESTIMATING POWER CONSUMPTION OF INTEGRATED CIRCUIT AND INTEGRATED CIRCUIT SIMULATION SYSTEM PERFORMING THE SAME

(71) Applicant: Baum Design Systems Co., Ltd., Seoul (KR)

(72) Inventors: In Hak Han, Daejeon (KR); Jonggyu Kim, Gyeonggi-do (KR)

(73) Assignee: Baum Design Systems Co., Ltd., Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 18/525,726

(22) Filed: Nov. 30, 2023

(65) Prior Publication Data

US 2024/0346218 A1     Oct. 17, 2024

(30) Foreign Application Priority Data

Apr. 11, 2023     (KR) ........................ 10-2023-0047401

(51) Int. Cl.
| | |
|---|---|
| *G06F 1/12* | (2006.01) |
| *G06F 1/28* | (2006.01) |
| *G06F 30/327* | (2020.01) |
| *G06F 30/3312* | (2020.01) |
| *G06F 30/3315* | (2020.01) |

(Continued)

(52) U.S. Cl.
CPC ............ *G06F 30/3312* (2020.01); *G06F 1/12* (2013.01); *G06F 1/28* (2013.01); *G06F 30/327* (2020.01); *G06F 30/3315* (2020.01); *G06F 2115/02* (2020.01); *G06F 2119/06* (2020.01); *G06F 2119/12* (2020.01)

(58) Field of Classification Search
CPC ............ G06F 30/3312; G06F 30/3315; G06F 30/327; G06F 1/12; G06F 1/28; G06F 2115/02; G06F 2119/06; G06F 2119/12
See application file for complete search history.

(56) References Cited

U.S. PATENT DOCUMENTS

| | | | |
|---|---|---|---|
| 6,810,482 | B1 | 10/2004 | Saxena et al. |
| RE44,479 | E | 9/2013 | Wang et al. |

(Continued)

FOREIGN PATENT DOCUMENTS

| | | |
|---|---|---|
| KR | 10-2011-0113551 A | 10/2011 |
| KR | 10-2016-0119121 A | 10/2016 |

(Continued)

*Primary Examiner* — Aurel Prifti
(74) *Attorney, Agent, or Firm* — Nicholas Park

(57) ABSTRACT

The technical idea of the present disclosure pertains to a simulation method and an integrated circuit simulation system for estimating power consumption of an integrated circuit. The method, according to this technical idea, involves determining a clock domain based on a clock flow in the integrated circuit, executing simulation for various modeling signals with different patterns in the targeted modeling clock domain, collecting an energy value consumed by each of the modeling signals based on a simulation result, and calculating the power consumption of the modeling clock domain based on at least one characteristic of the simulation clock.

8 Claims, 9 Drawing Sheets

<u>10</u>

(51) Int. Cl.
G06F 115/02 (2020.01)
G06F 119/06 (2020.01)
G06F 119/12 (2020.01)

(56) References Cited

U.S. PATENT DOCUMENTS

| 9,141,736 | B2 * | 9/2015 | Huilgol | G06F 30/398 |
| 9,183,335 | B2 * | 11/2015 | Ma | G06F 30/323 |
| 9,280,614 | B1 * | 3/2016 | Sood | G06F 30/392 |
| 10,460,048 | B2 * | 10/2019 | Dhanwada | G06F 30/396 |
| 10,860,761 | B1 * | 12/2020 | Vanukuri | G06F 30/396 |
| 10,878,155 | B2 * | 12/2020 | Kim | G06F 30/367 |
| 11,520,960 | B1 * | 12/2022 | Selvakumaran | G06F 30/3308 |
| 2005/0050494 | A1 * | 3/2005 | McGuffin | G06F 30/33 |
| | | | | 716/109 |
| 2006/0277509 | A1 * | 12/2006 | Tung | G06F 30/33 |
| | | | | 716/109 |
| 2008/0127001 | A1 * | 5/2008 | Tamaki | G06F 30/367 |
| | | | | 716/108 |
| 2012/0095737 | A1 * | 4/2012 | Sasaki | G06F 30/3323 |
| | | | | 703/2 |
| 2013/0151228 | A1 * | 6/2013 | Yi | G06F 1/3237 |
| | | | | 703/18 |
| 2014/0258948 | A1 * | 9/2014 | Jensen | G06F 30/327 |
| | | | | 716/104 |
| 2015/0067634 | A1 * | 3/2015 | Huilgol | G06F 30/20 |
| | | | | 716/136 |
| 2015/0160274 | A1 * | 6/2015 | Obara | G01R 21/133 |
| | | | | 702/61 |
| 2015/0220672 | A1 * | 8/2015 | Park | G06F 30/33 |
| | | | | 703/2 |
| 2017/0192485 | A1 * | 7/2017 | Dhanwada | G06F 1/3206 |
| 2018/0268088 | A1 * | 9/2018 | Oruganti | H03K 19/0016 |
| 2021/0201127 | A1 * | 7/2021 | Chen | G06F 30/367 |
| 2023/0010159 | A1 * | 1/2023 | Han | G06F 30/396 |
| 2024/0319773 | A1 * | 9/2024 | Karnam Venkat Naga | G06F 1/26 |
| 2025/0088358 | A1 * | 3/2025 | Wen | G06N 3/047 |

FOREIGN PATENT DOCUMENTS

| KR | 10-2021-0066289 A | 6/2021 |
| KR | 10-2350943 B1 | 1/2022 |

* cited by examiner

FIG. 2

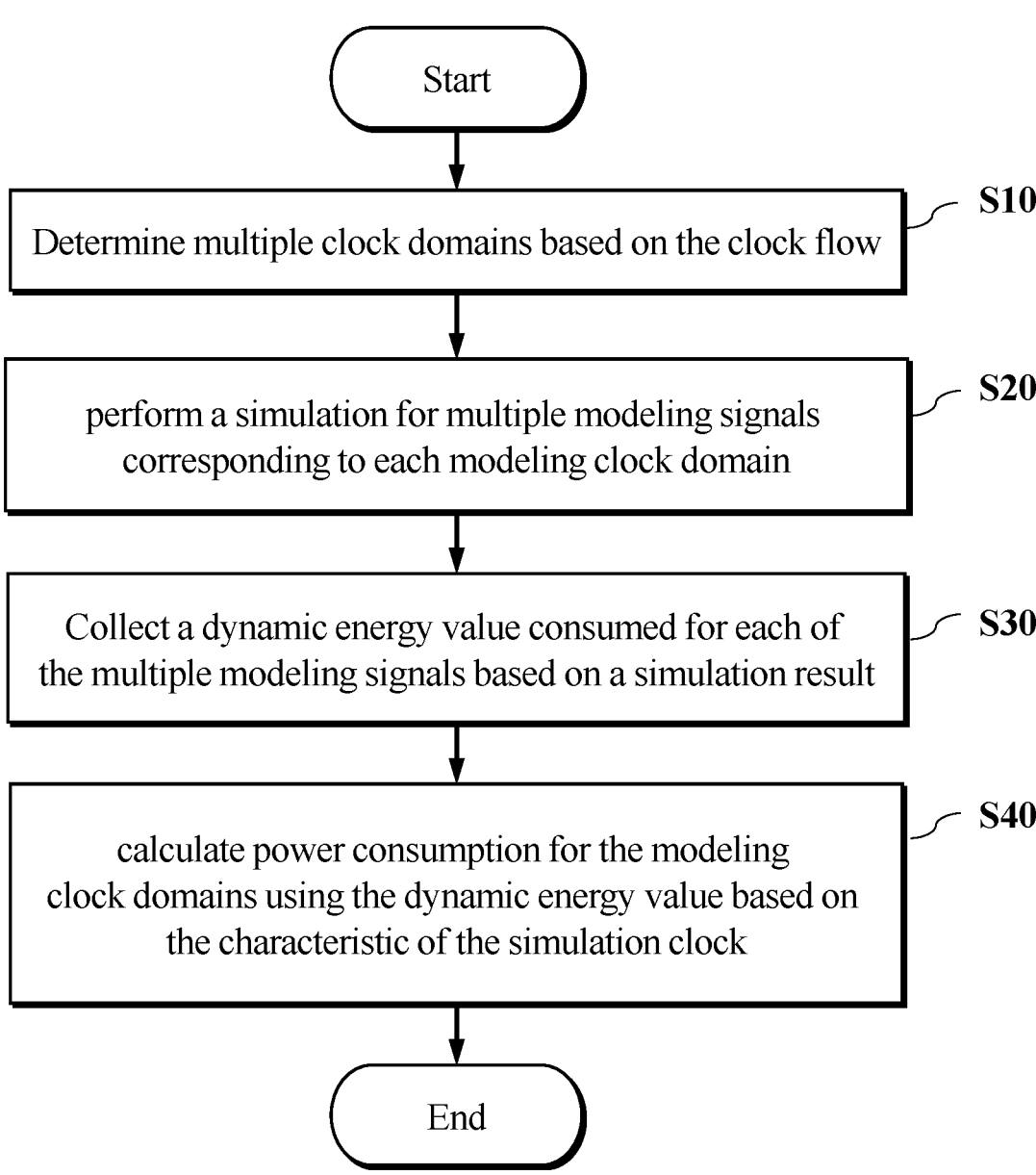

Start

Determine multiple clock domains based on the clock flow — S10 perform a simulation for multiple modeling signals corresponding to each modeling clock domain — S20

Collect a dynamic energy value consumed for each of the multiple modeling signals based on a simulation result — S30 calculate power consumption for the modeling clock domains using the dynamic energy value based on the characteristic of the simulation clock — S40

End

FIG. 3

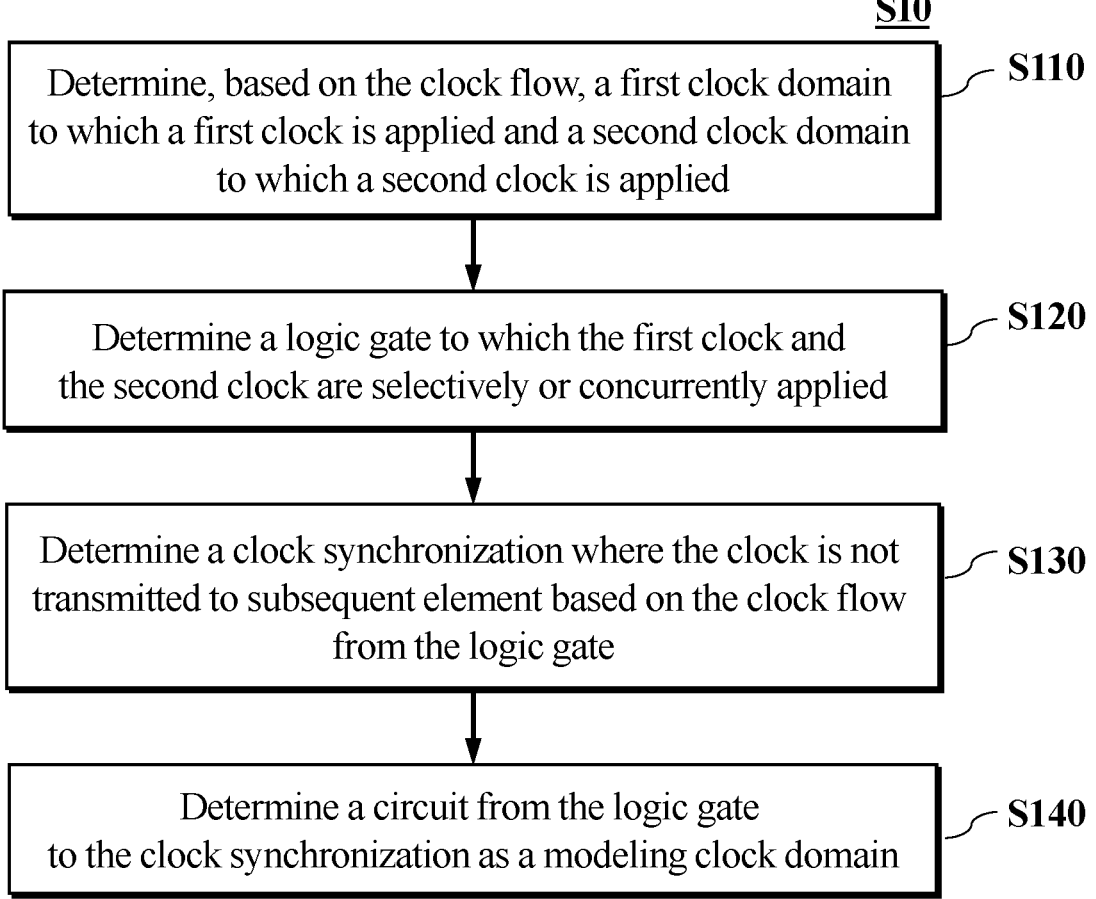

S10

Determine, based on the clock flow, a first clock domain to which a first clock is applied and a second clock domain to which a second clock is applied — S110

Determine a logic gate to which the first clock and the second clock are selectively or concurrently applied — S120

Determine a clock synchronization where the clock is not transmitted to subsequent element based on the clock flow from the logic gate — S130

Determine a circuit from the logic gate to the clock synchronization as a modeling clock domain — S140

__S30__

Simulate leakage power consumed regardless of a clock as a power value and simulate dynamic energy corresponding to power consumed by the clock as an energy value          S310

Store the leakage power as the power value          S320

Collect the dynamic energy as the energy value corresponding to multiple modeling signals          S330

S330

Calculate a data characteristic value corresponding to data patterns for modeling signals — S331

Generate an energy table by storing an energy value in correspondence with the calculated data characteristic value — S332

| Modeling Signal | Characteristic | Energy Value |
|:---:|:---:|:---:|
| MS1 | SC1 | E1 |
| MS2 | SC2 | E2 |
| MS3 | SC3 | E3 |
| MS4 | SC4 | E4 |

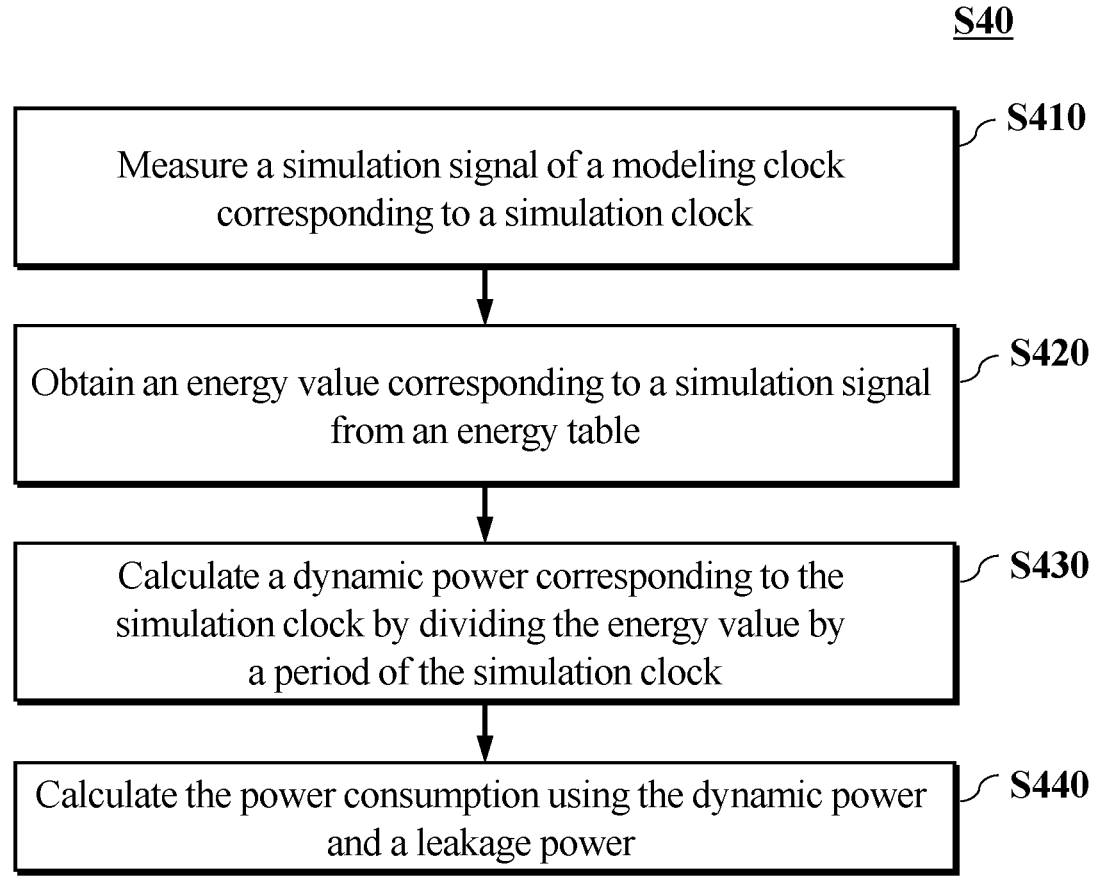

Measure a simulation signal of a modeling clock
corresponding to a simulation clock — S410

Obtain an energy value corresponding to a simulation signal
from an energy table — S420

Calculate a dynamic power corresponding to the
simulation clock by dividing the energy value by
a period of the simulation clock — S430

Calculate the power consumption using the dynamic power
and a leakage power — S440

SIMULATION METHOD FOR ESTIMATING POWER CONSUMPTION OF INTEGRATED CIRCUIT AND INTEGRATED CIRCUIT SIMULATION SYSTEM PERFORMING THE SAME

CROSS-REFERENCE TO RELATED APPLICATION

This application claims priority to and the benefit of Korean Patent Application No. 10-2023-0047401, filed on Apr. 11, 2023, the disclosure of which is incorporated herein by reference in its entirety.

BACKGROUND

Technical Field

The present disclosure relates to a method for simulating integrated circuits. More specifically, the present disclosure relates to a simulation method for estimating power consumption of integrated circuits and an integrated circuit simulation system performing the same.

Background Art

Integrated circuits refer to electronic devices in which various functions such as computation and storage are integrated onto a single semiconductor chip. As society advances, various types of mobile devices are being developed. Mobile devices pursue miniaturization and lightweight design by incorporating integrated circuit devices. However, the drawback of mobile devices is that they have limited power sources, such as batteries. To extend the operational lifespan of mobile devices, research is being conducted on increasing battery capacity and reducing power consumption in integrated circuit devices.

Estimating the power consumption of integrated circuit devices is a fundamental requirement for achieving low-power operation in integrated circuits. Traditional simulation methods suffer from issues such as excessive estimation time or low accuracy.

To address these problems, various methods have been proposed, among which clock-based modeling methods segment the circuit into clock domains, estimate power consumption for each clock domain, and are used. However, as integrated circuits become more advanced, situations have arisen where a plurality of clocks are used to drive a single integrated circuit, making it challenging to estimate power consumption for domains with different clocks in different operational states.

SUMMARY

Problem to be Solved

The technical idea of the present disclosure is to provide a modeling method and an integrated circuit simulation system that independently models a plurality of clock domains where a plurality of clocks can be applied.

Another objective of this disclosure is to provide a modeling method and an integrated circuit simulation system that calculates the power consumption of a target clock domain based on an energy value, stores a simulation result based on a characteristic of a simulation clock, and uses the stored energy value.

Solutions to the Problem

A simulation method for estimating power consumption of an integrated circuit according to the technical idea of this disclosure may comprise determining a plurality of clock domains based on a clock flow included in the integrated circuit; performing a simulation corresponding to a plurality of modeling signals, each having different patterns for a modeling clock domain selected from the plurality of clock domains; collecting an energy value consumed for each of the plurality of modeling signals based on a simulation result; calculating the power consumption of the modeling clock domain from the energy value based on a data pattern of a simulation clock.

In an embodiment, collecting the energy value consumed for each of the plurality of modeling signals may include simulating leakage power consumed regardless of an applied clock and dynamic energy consumed due to the applied clock; storing the leakage power as a power value; and storing the dynamic energy consumed for each of the plurality of modeling signals as the energy value.

In an embodiment, collecting the energy value consumed for each of the plurality of modeling signals may include calculating a data characteristic value corresponding to a data pattern for each of the plurality of modeling signals; and generating an energy table by storing the energy value corresponding to the calculated data characteristic value.

In an embodiment, calculating the power consumption of the modeling clock domain may include measuring a simulation signal of the modeling clock domain corresponding to the simulation clock; calculating the data characteristic value for each of the simulation signal; obtaining the energy value corresponding to the data characteristic value from an energy table; and calculating the power consumption using the energy value.

In an embodiment, calculating the power consumption using the energy value may include calculating dynamic power corresponding to the simulation clock by dividing the energy value by a period of the simulation clock; and calculating the power consumption using the dynamic power and the leakage power.

In an embodiment, determining the plurality of clock domains may include determining a first clock domain where a first clock is applied and a second clock domain where a second clock is applied based on the clock flow included in the integrated circuit; and determining the modeling clock domain where the first clock and the second clock are applied based on the clock flow.

In an embodiment, performing the simulation includes simulating the modeling clock domain using at least one of the plurality of modeling signals other than the first clock and the second clock.

In an embodiment, determining the modeling clock domain where the first clock and the second clock are applied based on the clock flow may include determining a logic gate where the first clock and the second clock are applied; determining a clock sink where the clock is not transmitted to subsequent element based on the clock flow from the logic gate, and determining a circuit from the logic gate to an input pin corresponding to the clock sink as the modeling clock domain.

In an embodiment, the logic gate may include at least one of AND gate, OR gate, NAND gate, NOR gate, XOR gate, XNOR gate, and MUX gate.

In an embodiment, the clock sink may include at least one clock pin of register and memory.

BRIEF DESCRIPTION OF THE DRAWINGS

FIG. 2 is a flowchart illustrating a simulation method according to an exemplary embodiment of the present disclosure.

FIG. 3 is a flowchart illustrating a simulation method according to an exemplary embodiment of the present disclosure.

FIG. 7 is a table illustrating an energy table according to an exemplary embodiment of the present disclosure.

FIG. 8 is a flowchart illustrating a simulation method according to an exemplary embodiment of the present disclosure.

DETAILED DESCRIPTION

Figure 1:
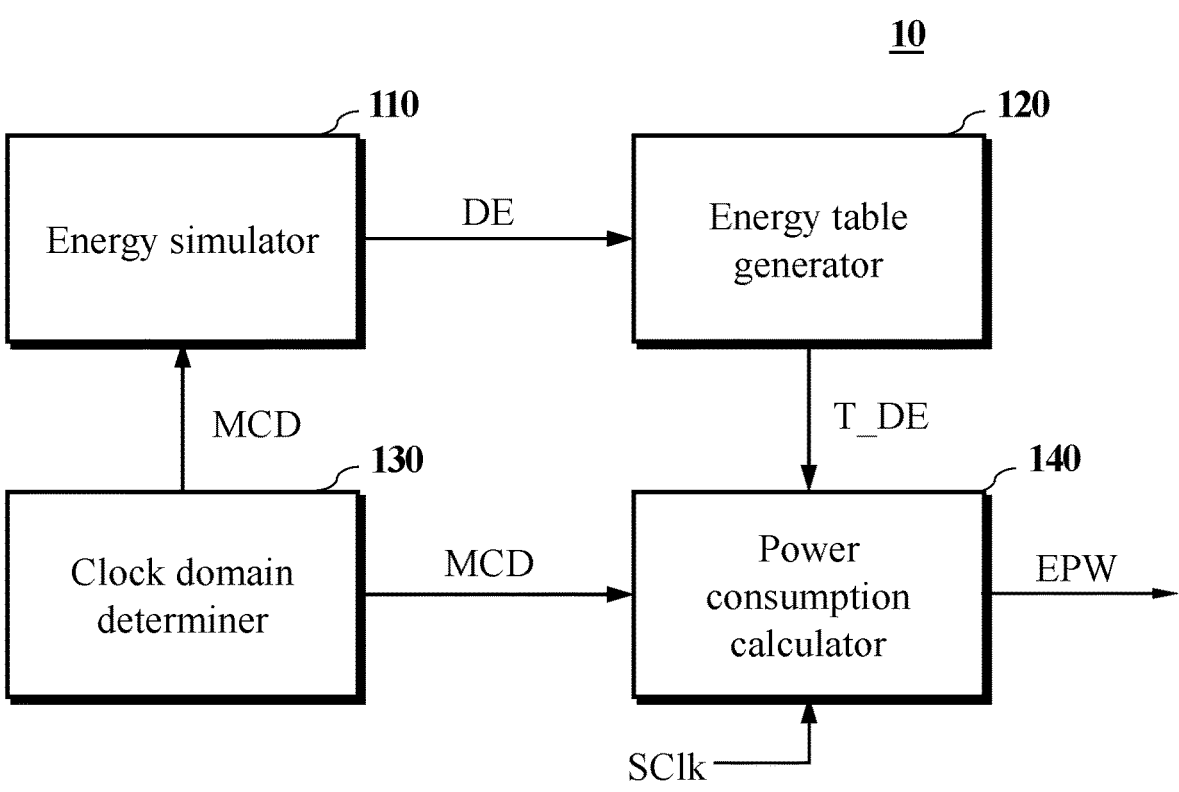
FIG. 1 is a flowchart illustrating an integrated circuit simulation system according to an exemplary embodiment of the present disclosure.

Hereinafter, preferred embodiments of the present disclosure will be described in detail with reference to the accompanying drawings. Advantages and features of the present disclosure, and methods of achieving them will become apparent with reference to the embodiments described below in detail in conjunction with the accompanying drawings. However, the technical idea of the present disclosure is not limited to the following embodiments, but may be implemented in various different forms, and only the following embodiments complete the technical idea of the present disclosure, and in the technical field where the present disclosure belongs It is provided to fully inform those of ordinary skill in the scope of the present disclosure, and the technical idea of the present disclosure is only defined by the scope of the claims.

In adding reference numerals to the components of each drawing, it should be noted that the same components are given the same reference numerals as much as possible even though they are indicated on different drawings. In addition, in describing the present disclosure, if it is determined that a detailed description of a related known configuration or function may obscure the gist of the present disclosure, the detailed description thereof will be omitted.

Unless otherwise defined, all terms (including technical and scientific terms) used herein may be used with the meaning commonly understood by those of ordinary skill in the art where this disclosure belongs. In addition, terms defined in a commonly used dictionary are not to be interpreted ideally or excessively unless clearly specifically defined. The terminology used herein is for the purpose of describing the embodiments and is not intended to limit the present disclosure. In this specification, the singular also includes the plural unless otherwise specified in the phrase.

In addition, in describing the components of the present disclosure, terms such as first, second, A, B, (a), (b), etc. may be used. These terms are only for distinguishing the component from other components, and the essence, order, or order of the component is not limited by the term. When it is described that a component is "connected", "coupled" or "connected" to another component, the component may be directly connected or connected to the other component, but it should be also understood but another component may be "connected," "coupled," or "connected" between each component.

As used herein, "comprises" and/or "comprising" may not exclude at least one of other components, steps, operations and/or elements besides referenced component, step, operation and/or element.

A component included in an embodiment and a component having a common function may be described using the same name in another embodiment. Unless otherwise stated, the descriptions in any an embodiment may be applied to other embodiments, and specific descriptions will be omitted within the overlapping range or within the range that can be clearly understood by those skilled in the art.

Hereinafter, the present disclosure will be described in detail with reference to preferred embodiments of the present disclosure and the accompanying drawings.

FIG. 1 is a flowchart illustrating an integrated circuit simulation system according to an exemplary embodiment of the present disclosure.

According to FIG. 1, an integrated circuit simulation system 10 can include various configurations used in designing an integrated circuit (IC). The integrated circuit simulation system 10 can be implemented on various terminal devices, including server, personal computer (PC), cellular phone, smartphone, laptop, navigation device, personal communication system (PCS), Global System for Mobile Communication (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (Wibro) terminal, smartpad, tablet PC, and other such devices.

The integrated circuit may operate on a clock gating basis. The integrated circuit may be divided into a clock gating input cone and a clock gating domain centering on a clock gating cell. The clock gating input cone may be configured to control a clock gating enable signal in response to the input signal. For example, the clock gating input cone may be configured to control the clock gating enable signal to a logic low or logic high.

The clock gating cell is configured to stop and resume clock supply to the clock gating domain in response to the clock gating enable signal. For example, the clock gating cell may be configured to receive a clock and output the received clock to the clock gating domain in response to the clock gating enable signal.

The clock gating domain can be configured to operate in response to the gated clock. For example, the clock gating domain may respond to the gated clock to produce output signals. When the clock gating cell stops outputting the gated clock, the clock gating domain may stop operating. For example, the clock gating domain may stop operating while maintaining data in response to the stop of the clock output from the clock gating cell. Accordingly, dynamic power consumption in the clock gating domain can be prevented.

In this specification, the term 'clock gating domain' may refer to a fan-out logic cone where the supply of a gated clock is controlled by a single clock gating cell, and the term 'clock domain' can refer to at least one clock gating domain supplied by a clock.

The operation of the integrated circuit simulation system 10 or its included configurations in this specification may refer to actions performed by a processor included in the integrated circuit simulation system 10 based on a computer program that includes at least one instruction stored in a storage device included in the integrated circuit simulation system 10. The storage device may include non-volatile memory, volatile memory, flash memory, hard disk drive (HDD), or solid-state drive (SSD), among others. Additionally, the processor may include at least one of a Central Processing Unit (CPU), Graphic Processing Unit (GPU), Neural Processing Unit (NPU), RAM, ROM, system bus, and application processor.

The integrated circuit simulation system 10 may include an energy simulator 110, an energy table generator 120, a clock domain determiner 130, and a power consumption calculator 140. The energy simulator 110, energy table generator 120, clock domain determiner 130, and power consumption calculator 140 may be software modules defined as functional units performed by a processor included in the integrated circuit simulation system 10. The operations performed by the energy simulator 110, energy table generator 120, clock domain determiner 130, and power consumption calculator 140 may be executed through separate software modules using a plurality of hardware components or a single hardware component.

The energy simulator 110 may obtain a dynamic energy value (DE) for a modeling clock domain (MCD) that is subject of modeling among a plurality of clock domains by performing a simulation. According to an embodiment of the present disclosure, MCD may be determined as a clock domain in which two or more clocks among a plurality of clock domains can be selectively or simultaneously applied based on the clock flow. MCD may be determined as a clock domain from the remaining input pin, excluding clock pins of register and memory, by passing through a clock sink (e.g., at least one clock pin of register and memory) where the clock is not subsequently transmitted after being transmitted from a logic gate (e.g., AND gate, OR gate, NOR gate, XOR gate, XNOR gate, and MUX).

In an exemplary embodiment, the energy simulator 110 may perform a simulation for a plurality of modeling signals with different patterns. In this specification, each of the plurality of modeling signals may be a set of signals sensed at a node of the modeling clock domain (MCD), and the energy simulator 110 may obtain the plurality of modeling signals and the corresponding dynamic energy value (DE) of the modeling clock domain (MCD) based on various scenarios for operating the integrated circuit through simulation.

In an exemplary embodiment, the energy simulator 110 may obtain leakage power for the modeling clock domains (MCD) as a result of simulating the integrated circuit and store the obtained leakage power as a power value.

The energy table generator 120 may generate an energy table (T_DE) based on the dynamic energy value (DE) for a plurality of modeling signals generated by the energy simulator 110. In an exemplary embodiment, the energy table generator 120 may generate the energy table (T_DE) by associating the dynamic energy value (DE) with patterns for each of the plurality of modeling signals. In another embodiment, the energy table generator 120 may calculate a data characteristic (such as toggle rates, the ratio of '1's, the ratio of '0's, etc.) for data patterns corresponding to a plurality of modeling signals and store dynamic energy value (DE) corresponding to the data characteristic value in the energy table (T_DE).

The clock domain determiner 130 may determine a clock domain and modeling clock domain (MCD) based on the clock flow of the integrated circuit. In an exemplary embodiment, the clock domain determiner 130 may designate a plurality of clock gating domains that receive the same clock as a single clock domain and designate a modeling clock domain (MCD) where two or more clocks among a plurality of clock domains can be selectively or simultaneously applied. In an exemplary embodiment, the clock domain determiner 130 may designate, as a modeling clock domain (MCD), a clock domain from the remaining input pin, excluding clock pins of register and memory, by passing through a clock sink (e.g., at least one clock pin of register and memory) where the clock is not subsequently transmitted after being transmitted from a logic gate (e.g., AND gate, OR gate, NAND gate, NOR gate, XOR gate, XNOR gate, and MUX).

According to an exemplary embodiment of the present disclosure, by setting a modeling clock domain, where a plurality of clocks can be applied, as a separate clock domain and modeling through an independent simulation clock, a clock value of the modeling clock domain, that can vary depending on an operating scenario of the integrated circuit, may be applied to power consumption estimation modeling. As a result, the accuracy of power consumption estimation may be improved.

The power consumption calculator 140 may calculate power consumption (EPW) based on the clock domain and modeling clock domain (MCD). In an exemplary embodiment, the power consumption calculator 140 may measure a simulation signal of the modeling clock domain (MCD) corresponding to a simulation clock (SClk) and obtain a dynamic energy value (DE) from an energy table (T_DE) based on the characteristic of the simulation signal. Additionally, the power consumption calculator 140 may calculate dynamic power from the dynamic energy value (DE) using the simulation clock (SClk). In an exemplary embodiment, the power consumption calculator 140 may calculate the dynamic power by dividing the energy value (DE) by the period of the simulation clock (SClk). Furthermore, the power consumption calculator 140 may calculate power consumption (EPW) by adding the dynamic power calculated using the dynamic energy value (DE) to the leakage power stored as a power value.

In this specification, the simulation clock (SClk) may refer to the clock applied to the modeling clock domain (MCD) in the operating scenario for measuring power consumption of the integrated circuit. The simulation signal may be a signal measured at the measurement node of the modeling signals used when storing the energy table (T_DE), corresponding to the simulation clock (SClk).

In the case of the modeling clock domain, the characteristic of the applied clock (e.g., frequency, offset, period, etc.) may vary depending on the operating scenario of the integrated circuit. According to an exemplary embodiment of the present disclosure, by storing dynamic power in the modeling clock domain (e.g., power consumed by the clock) as dynamic energy value (DE) (e.g., joule (J) or calorie (cal)) and calculating the dynamic power from the dynamic energy value (DE) based on the characteristics of the actually applied simulation clock (SClk), accurate estimation of dynamic power may be achieved, even when the simulation clock applied to the modeling clock domain varies according to the operating scenario. As a result, the accuracy of power consumption estimation may be improved.

FIG. 2 is a flowchart illustrating a simulation method according to an exemplary embodiment of the present disclosure.

According to FIG. 2, an integrated circuit simulation system 10 may determine a plurality of clock domains based on the clock flow S10. In an exemplary embodiment, the integrated circuit simulation system 10 may designate a circuit area where a clock is applied as a clock domain and designates a clock domain where a plurality of clocks is selectively or simultaneously applied as a modeling clock domain.

The integrated circuit simulation system 10 may perform a simulation for a plurality of modeling signals corresponding to each modeling clock domain S20. In an exemplary embodiment, the integrated circuit simulation system 10 may perform a simulation for different operating scenarios of the integrated circuit and obtain a simulation result for a plurality of modeling signals.

The integrated circuit simulation system 10 may collect a dynamic energy value consumed for each of the plurality of modeling signals based on a simulation result S30. In this specification, the dynamic energy value may refer to values stored using energy values corresponding to dynamic power consumed by clocks, while leakage power may refer to values consumed independent of the clock.

The integrated circuit simulation system 10 may calculate power consumption for the modeling clock domains using the dynamic energy value based on the characteristic of the simulation clock S40. In an exemplary embodiment, the integrated circuit simulation system 10 may use the simulation clock applied to the modeling clock domain in actual operating scenario to simulate the integrated circuit, obtain a simulation signal, and obtain a dynamic energy value for modeling signals corresponding to the simulation signal based on the characteristic of the simulation signal. Additionally, the integrated circuit simulation system 10 may calculate dynamic power by dividing the dynamic energy value by a period of the simulation clock and calculate power consumption by adding the pre-calculated leakage power to the calculated dynamic power.

Figure 4:
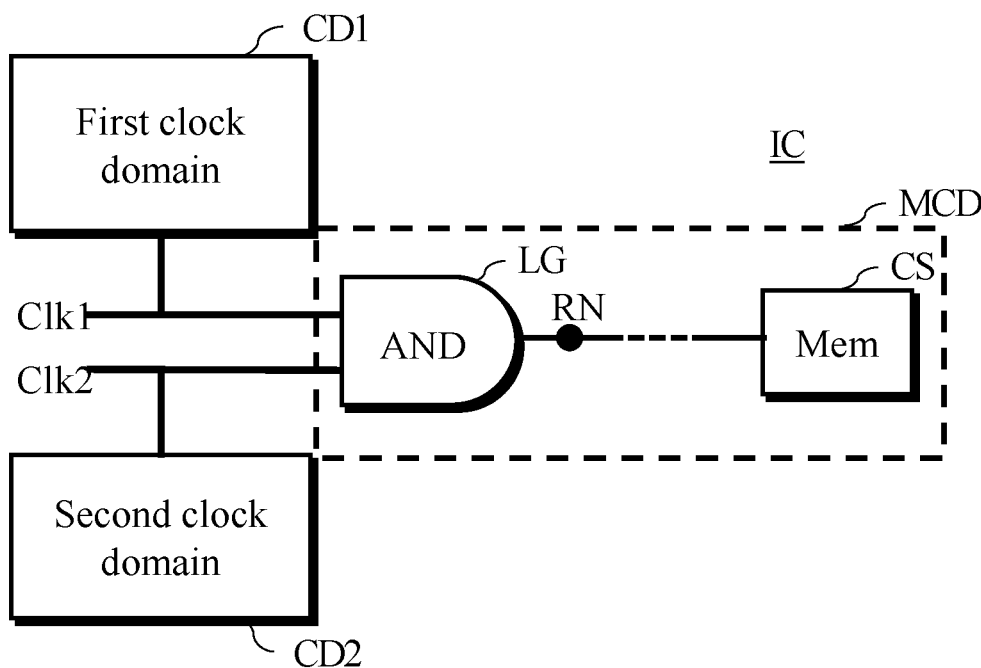
FIG. 4 is a block diagram illustrating an integrated circuit that serves as a simulation target according to an exemplary embodiment of the present disclosure.

FIG. 3 is a flowchart illustrating a simulation method according to an exemplary embodiment of the present disclosure, and FIG. 4 is a block diagram illustrating an integrated circuit that serves as a simulation target according to an exemplary embodiment of the present disclosure. In detail, FIG. 3 illustrates a modeling clock domain determination step S10 of FIG. 2, and FIG. 4 illustrates a method for determining the integrated circuit (IC) as a plurality of clock domains and a modeling clock domain according to the modeling clock domain determination step.

According to FIG. 3, an integrated circuit simulation system 10 may determine, based on the clock flow, a first clock domain where a first clock is applied and a second clock domain where a second clock is applied S110. According to FIG. 4, based on the clock flow, a first clock domain (CD1) where a first clock (Clk1) is applied and a second clock domain (CD2) where a second clock (Clk2) is applied can be determined.

According to FIG. 3, the integrated circuit simulation system 10 may determine a logic gate where the first clock and the second clock are selectively or concurrently applied S120. Moreover, the integrated circuit simulation system 10 may determine a clock sink where the clock is not transmitted to subsequent element based on the clock flow from the logic gate S130. The integrated circuit simulation system 10 may determine the circuit from the logic gate, passing through the clock sink, up to the remaining input pin excluding the clock pins of the register and memory corresponding to the clock sink, as a modeling clock domain S140.

According to FIG. 4, an AND gate connected to the first clock (Clk1) and the second clock (Clk2) may be determined as a logic gate (LG). Based on the clock flow from the logic gate (LG), a clock pin of memory (Mem) may be determined as a clock sink (CS). Furthermore, a circuit between the memory (Mem) and AND gate may be determined as a modeling clock domain (MCD). An arbitrarily determined point within the modeling clock domain (MCD) may be designated as a reference node (RN), and an energy table may be generated based on modeling signals for the reference node (RN). Additionally, a dynamic various circuit energy value may be determined based on a simulation signal for the reference node (RN). Further details are provided in FIG. 5 to FIG. 8.

In an embodiment of the present disclosure, accurate power consumption may not be calculated due to differences in clock characteristics caused by selectively applied a plurality of clocks depending on an operating scenario. By using a simulation clock separate from the first clock domain (CD1) and the second clock domain (CD2) to measure power consumption, the power consumption reflecting the clock actually applied to the modeling clock domain (MCD) may be calculated. As a result, accurate power consumption may be estimated.

Figure 5:
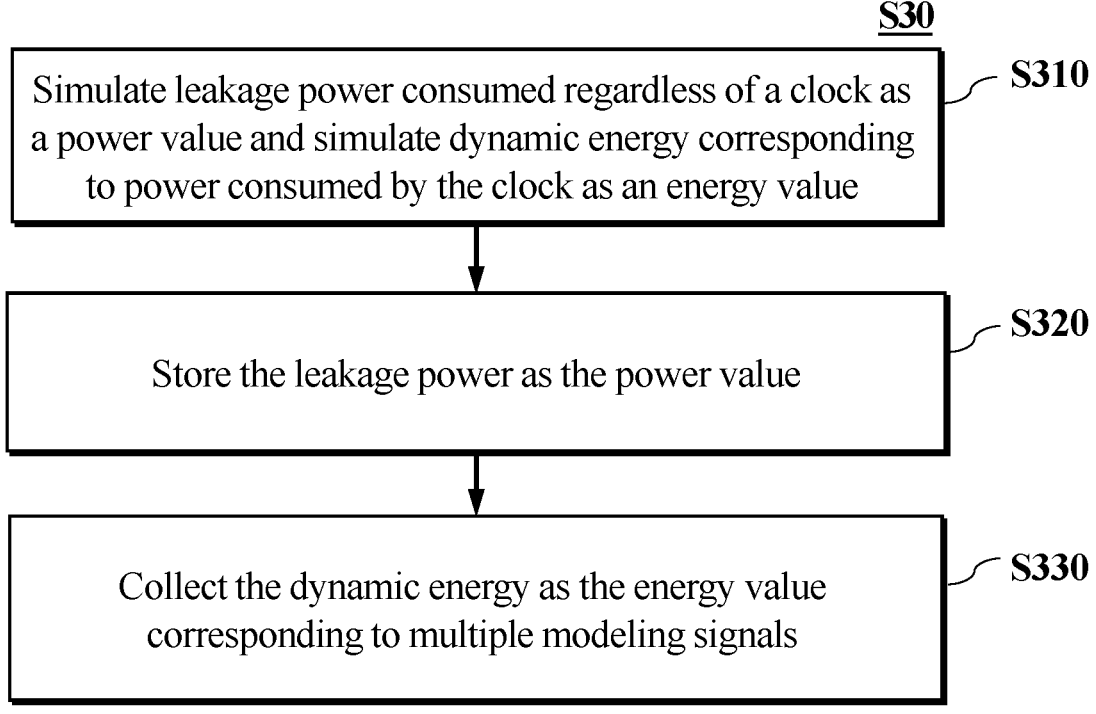
FIG. 5 is a flowchart illustrating a simulation method according to an exemplary embodiment of the present disclosure.

FIG. 5 is a flowchart illustrating a simulation method according to an exemplary embodiment of the present disclosure. In detail, FIG. 5 illustrates a dynamic energy value collection step S30 of FIG. 2.

According to FIG. 5, an integrated circuit simulation system 10 may simulate leakage power consumed regardless of a clock as a power value and simulate dynamic energy corresponding to power consumed by the clock as an energy value S310. The integrated circuit simulation system 10 may store the leakage power as the power value (e.g., unit such as watt [W] or watt-hour (Wh)) S320 and collect the dynamic energy as the energy value (e.g., unit such as joule (J) or calorie (cal)) corresponding to a plurality of modeling signals S330.

According to an embodiment of the present disclosure, dynamic power that may vary depending on a characteristic of a simulation clock in a modeling clock domain (MCD), which is used when confirming actual power consumption, may be collected as dynamic energy in energy values rather than power values. Subsequently, the collected dynamic energy value can be used to calculate dynamic power reflecting the characteristic of the simulation clock through a conversion formula (e.g., $P=E/t$, where P is power, E is energy, and t is the period of time).

Furthermore, according to an embodiment of the present disclosure, a dynamic energy value reflecting changes in operation occurring in the modeling clock domain (MCD) corresponding to the simulation clock may be obtained. The dynamic energy value may be collected for a plurality of modeling signals that may be observed at a specific node (e.g., the reference node (RN) in FIG. 4) of the modeling clock domain (MCD) and obtained based on a simulation signal that may be observed at the specific node corresponding to the simulation clock. As a result, this allows for the accurate estimation of power consumption.

Figure 6:
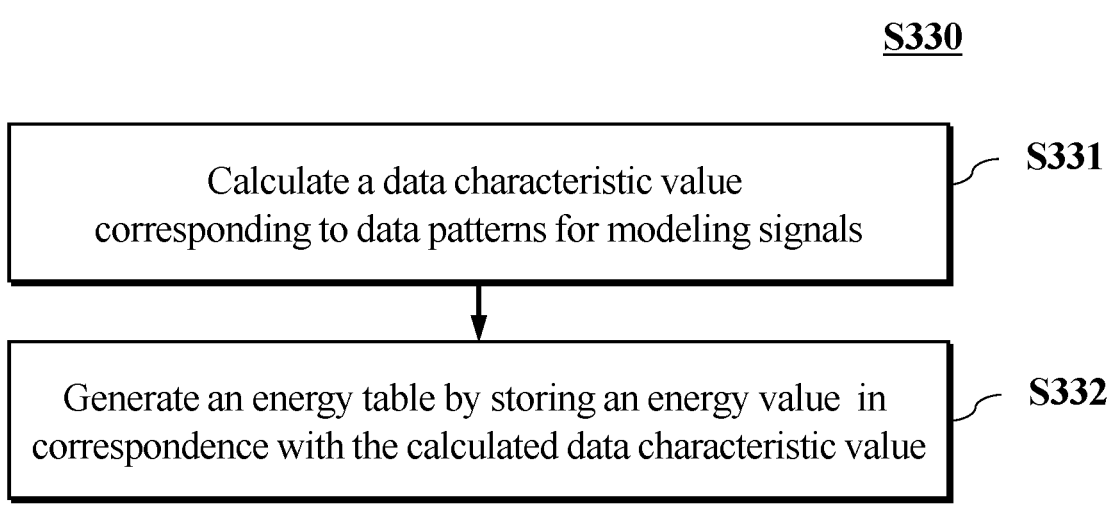
FIG. 6 is a flowchart illustrating a simulation method according to an exemplary embodiment of the present disclosure.

FIG. 6 is a flowchart illustrating a simulation method according to an exemplary embodiment of the present disclosure, and FIG. 7 is a table illustrating an energy table according to an exemplary embodiment of the present disclosure. More specifically, FIG. 6 refers to a dynamic energy value collection step S330 of FIG. 5, and FIG. 7 refers to the energy table generated as a result of the dynamic energy value collection step S330.

According to FIG. 6, an integrated circuit simulation system 10 may calculate a data characteristic value corresponding to data patterns for modeling signals S331. As previously described, modeling signals may refer to signals obtained at a specific node within a modeling clock domain for various integrated circuit operation scenarios and may have specific data patterns based on '1' and '0'. The integrated circuit simulation system 10 may calculate the data characteristic value (e.g., toggle rate, '1' ratio, '0' ratio) based on the data patterns of modeling signals.

The integrated circuit simulation system 10 may generate an energy table by storing an energy value obtained from a simulation result (e.g., a simulation result of step S20 of FIG. 2) in correspondence with the calculated data characteristic value S332.

According to FIG. 7, different characteristic values (SC1, SC2, SC3, SC4) may be calculated corresponding to a plurality of modeling signals (MS1, MS2, MS3, MS4), and energy values (E1, E2, E3, E4) obtained from a simulation result may be stored corresponding to the characteristic values.

According to an embodiment of the present disclosure, by storing energy values corresponding to characteristic values, energy values corresponding to simulation signals may be easily obtained.

FIG. 8 is a flowchart illustrating a simulation method according to an exemplary embodiment of the present disclosure. Specifically, FIG. 8 illustrates a power consumption calculation step S40 of FIG. 2.

According to FIG. 8, an integrated circuit simulation system 10 may measure a simulation signal of a modeling clock corresponding to a simulation clock applied to a modeling clock domain in a scenario where actual power consumption is desired to be obtained S410. In an embodiment, the integrated circuit simulation system 10 may measure a simulation signal at a reference node (FIG. 4, RN) where a modeling signal is obtained.

The integrated circuit simulation system 10 may obtain an energy value corresponding to a simulation signal from an energy table (T_DE) S420. In an embodiment, the integrated circuit simulation system 10 may calculate a characteristic value of the simulation signal and obtain the energy value corresponding to the calculated characteristic value from the energy table (T_DE).

Explaining with reference to the example in FIG. 7, in the case where 'SC3' is obtained as a characteristic value (e.g., toggle rate) based on the data patterns of the simulation signal, the integrated circuit simulation system 10 may obtain 'E3' as an energy value from the energy table (T_DE).

The integrated circuit simulation system 10 may calculate a dynamic power corresponding to the simulation clock by dividing the energy value by a period of the simulation clock S430. The integrated circuit simulation system 10 may calculate the power consumption by adding the calculated dynamic power to a previously obtained leakage power (e.g., obtained in S320 of FIG. 5) S440.

As previously mentioned, an energy value and power value have a conversion relationship of $P=E/t$ (where P is power value, E is energy value, t is period). Therefore, by dividing the energy value by the period of the simulation clock, the dynamic power may be easily obtained. As a result, the dynamic power may be accurately calculated while reflecting changes in a characteristic of the simulation clock.

Figure 9:
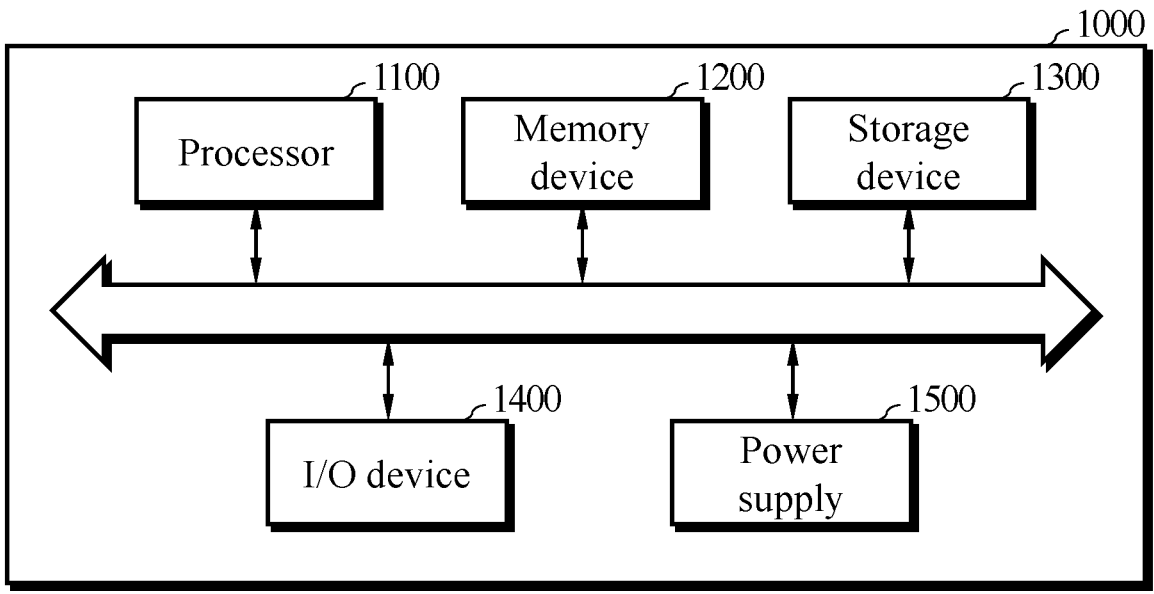
FIG. 9 is a block diagram illustrating an integrated circuit simulation system according to an exemplary embodiment of the present disclosure.

FIG. 9 is a block diagram illustrating an integrated circuit simulation system according to an exemplary embodiment of the present disclosure.

According to FIG. 9, the integrated circuit simulation system 1000 may include a processor 1100, memory device 1200, storage device 1300, input/output device 1400, and power supply 1500. Additionally, although not illustrated in FIG. 9, the integrated circuit simulation system 1000 may further include ports to communicate with a video card, sound card, memory card, USB device, and other electronic devices.

Therefore, the processor 1100, memory device 1200, storage device 1300, power supply 1500, and input/output device 1400 included in the integrated circuit simulation system 1000 may perform an operation of the integrated circuit simulation system according to embodiments of the present disclosure. Specifically, the operation of the integrated circuit simulation system 1000 as described in FIG. 1 to FIG. 8 may be performed by the processor 1100 based on a computer program including at least one command stored in the memory device 1200 and storage device 1300.

The processor 1100 may perform specific calculations or tasks. In various embodiments, the processor 1100 may include at least one of a microprocessor, CPU (Central Processing Unit), GPU (Graphic Processing Unit), NPU (Neural Processing Unit), RAM (Random Access Memory), ROM (Read-Only Memory), system bus, and application processor. The processor 1100 may communicate with the memory device 1200, storage device 1300, and input/output device 1400 via buses such as an address bus, control bus, and data bus. In some embodiments, the processor 1100 may also be connected to expansion buses such as Peripheral Component Interconnect (PCI) buses.

The memory device 1200 may store data necessary for the operation of the integrated circuit simulation system 1000. For example, the memory device 1200 may be implemented using DRAM (Dynamic Random-Access Memory), mobile DRAM, SRAM (Static Random-Access Memory), PRAM (Phase-Change RAM), FRAM (Ferroelectric RAM), RRAM (Resistive RAM), and/or MRAM (Magnetoresistive RAM). The storage device 1300 may include solid-state drives, hard disk drives, CD-ROMs (Compact Disc Read-Only Memory), and the like. Both the memory device 1200 and storage device 1300 may store programs related to the simulation method described in FIG. 1 to FIG. 8.

Input/output device 1400 may include input means such as keyboards, keypads, and mice, and output means such as printers and displays. The power supply device 1500 may supply operating voltage required for the operation of the integrated circuit simulation system 1000.

Integrated circuits designed according to the embodiments of the present disclosure, as described above, may be implemented in various forms of packages. For example, at least some components of the integrated circuit may be assembled using packages such as Package on Package (PoP), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

According to the technical idea of this disclosure, by independently modeling a plurality of clock domains where a plurality of clocks may be applied, it is possible to estimate power consumption reflecting the characteristic of the simulation clocks actually used. As a result, the accuracy of the estimated power consumption may be significantly improved.

As described above, exemplary embodiments have been disclosed in the drawings and specification. While specific terminology has been used to describe the embodiments in this specification, it has been used for the purpose of explaining the technical ideas of the present disclosure and should not be construed to limit the scope of the disclosure or the claims listed.

Therefore, those skilled in the art will understand that various modifications and equivalent embodiments are possible from this disclosure without departing from the scope of the present disclosure, as defined by the technical ideas in the appended claims.

In essence, the true scope of protection of the present disclosure should be determined by the technical ideas set forth in the attached claims.

This work was supported by Institute of Information & communications Technology Planning & Evaluation (IITP) grant funded by the Korea government (MSIT) (No. 2021-0-00754, Software Systems for AI Semiconductor Design).

What is claimed is:

1. A simulation method for estimating power consumption of an integrated circuit, performed by a processor, comprising:

determining, by the processor, a plurality of clock domains based on a clock flow included in the integrated circuit;

performing, by the processor, a simulation corresponding to a plurality of modeling signals, each having different patterns for a modeling clock domain selected from the plurality of clock domains;

collecting, by the processor, an energy value consumed for each of the plurality of modeling signals based on the simulation result; and calculating, by the processor, the power consumption of the modeling clock domain from the energy value based on a data pattern of a simulation clock, wherein the collecting the energy value consumed for each of the plurality of modeling signals comprises:

simulating leakage power consumed regardless of an applied clock and dynamic energy consumed due to the applied clock;

storing the leakage power as a power value; and storing the dynamic energy consumed for each of the plurality of modeling signals as the energy value, wherein the calculating the power consumption of the modeling clock domain comprises:

measuring a simulation signal of the modeling clock domain corresponding to the simulation clock;

calculating a data characteristic value for each of the simulation signal;

obtaining the energy value corresponding to the data characteristic value from an energy table; and calculating the power consumption using the energy value.

2. The simulation method of claim 1, wherein the collecting the energy value consumed for each of the plurality of modeling signals comprises:

calculating the data characteristic value corresponding to a data pattern for each of the plurality of modeling signals; and generating an energy table by storing the energy value corresponding to the calculated data characteristic value.

3. The simulation method of claim 1, wherein the calculating the power consumption using the energy value comprises:

calculating dynamic power corresponding to the simulation clock by dividing the energy value by a period of the simulation clock; and calculating the power consumption using the dynamic power and the leakage power.

4. The simulation method of claim 1, wherein the determining the plurality of clock domains comprises:

determining a first clock domain where a first clock is applied and a second clock domain where a second clock is applied based on the clock flow included in the integrated circuit; and determining the modeling clock domain where the first clock and the second clock are applied based on the clock flow.

5. The simulation method of claim 4, wherein the performing the simulation comprises:

simulating the modeling clock domain using at least one of the plurality of modeling signals other than the first clock and the second clock.

6. The simulation method of claim 4, wherein the determining the modeling clock domain where the first clock and the second clock are applied based on the clock flow comprises:

determining a logic gate where the first clock and the second clock are applied;

determining a clock sink where the clock is not transmitted to subsequent element based on the clock flow from the logic gate; and determining a circuit from the logic gate to an input pin corresponding to the clock synchronization as the modeling clock domain.

7. The simulation method of claim 6, wherein the logic gate comprises at least one of AND gate, OR gate, NAND gate, NOR gate, XOR gate, XNOR gate, and MUX.

8. The simulation method of claim 6, wherein the clock sink comprises at least one clock pin of register and memory.

* * * * *